United States Patent [19]

Kurihara et al.

[11] Patent Number: 5,629,809
[45] Date of Patent: May 13, 1997

[54] OPTICAL PICKUP FOR REPRODUCING INFORMATION ON A DISC

[75] Inventors: Toshihiko Kurihara; Taichi Akiba; Osamu Ueda; Shinichi Takahashi, all of Saitama-ken, Japan

[73] Assignee: Pioneer Electronic Corporation, Tokyo, Japan

[21] Appl. No.: 660,957

[22] Filed: Jun. 12, 1996

Related U.S. Application Data

[63] Continuation of Ser. No. 391,279, Feb. 21, 1995, abandoned, which is a continuation of Ser. No. 80,768, Jun. 24, 1993, abandoned.

[30] Foreign Application Priority Data

Jun. 26, 1992 [JP] Japan .................................. 4-192941

[51] Int. Cl.$^6$ .................................................. G11B 7/095
[52] U.S. Cl. ........................ 359/813; 359/823; 369/44.14; 369/44.15
[58] Field of Search ..................... 369/44.15, 44.14, 369/13, 44.22, 44.16, 44.21; 359/814, 813, 823, 824, 820

[56] References Cited

U.S. PATENT DOCUMENTS

| 4,750,164 | 6/1988 | Nose ................... 369/44.15 X |
| 5,073,882 | 12/1991 | Sasaki ................. 369/44.15 |
| 5,109,368 | 4/1992 | Ohta et al. ............ 369/44.15 X |
| 5,132,534 | 7/1992 | Namigawara ............. 369/44.15 X |

FOREIGN PATENT DOCUMENTS 02-183424  7/1990  Japan .

*Primary Examiner*—Thang V. Tran
*Attorney, Agent, or Firm*—Nkaido Marmelstein Murray & Oram LLP

[57] ABSTRACT

An optical pickup for reproducing information on a disc has a pickup body mounting an optical system and a yoke base mounting an actuator. The pickup body and the yoke base are made of the same magnetic material.

7 Claims, 4 Drawing Sheets

OPTICAL PICKUP FOR REPRODUCING INFORMATION ON A DISC

This application is a continuation application of application Ser. No. 08/391,279, filed Feb. 21, 1995, which is a continuation application of application Ser. No. 08/080,768, filed on Jun. 24, 1993, both abandoned.

FIELD OF THE INVENTION

The present invention relates to an optical pickup for reproducing information on a disc such as a compact disc (CD) and an optical video disc.

BACKGROUND OF THE INVENTION

Various improvements are tried in providing an optical pickup of compact size and light weight. As one example, a pickup where a pickup holder having an objective for an optical system is suspended from a suspension base by a twin-shaft spring in the form of a cantilever has been developed.

FIG. 7 shows a conventional optical pickup. The optical pickup comprises a pickup body 20 for mounting an optical system and a yoke base 10 provided with an actuator and mounted on the pickup body 20.

The yoke base 10 is made of magnetic material and comprises a base plate 11 and a pair of side plates 13. A pair of yokes 15 are secured to the base plate 11. A pair of magnets 14 are, secured to the side plates 13 adjacent the yokes 15. A magnetic circuit is formed by the magnets 14 and the yokes 15. A suspension base 12 is provided on a flange portion 13a of one of the side plates 13. A holder 17 as a base of a pickup head is suspended from the yoke base 10 by conductive four spring wires 18 in the form of a cantilever. The holder 17 has an objective 16 for the optical system and a pair of coil substrates (not shown) for tracking and focusing. The holder 17 is disposed between the yokes 15 so as to oppose the coil substrates to the yokes, respectively.

The pickup body 20 is made of plastic or metal such as aluminum or zinc formed by projection molding or machining. The body 20 has recessed portions 21, 22 and 23 in which various elements for the optical system are mounted. A semiconductor laser device 24 is mounted in the portion 21. A half mirror 25 and an optical electronic integrated circuit (OEIC) 26 are mounted in the portion 23. A reflecting mirror 27 is mounted in the portion 22.

The yoke base 10 is secured to the pickup body 20 by screws 30 engaged with holes 19 of the base 10 and holes 20a formed in the pickup body 20.

In operation, a laser beam emitted from the semiconductor laser device 24 is reflected on the half mirror 25 to the reflecting mirror 27 passing through a collimator lens (not shown) where the beam is shaped into a parallel beam. The beam is reflected on the reflecting mirror 27 to the objective 16 and focused on an optical disc (not shown) by the objective 16.

The reflected beam from the disc passes in reverse and is reflected on the half mirror 25 to the circuit 26 and focused thereon by a condenser lens (not shown).

Since the yoke base 10 made of magnetic material is secured to the pickup body 20 made of another material such as plastic, aluminum or zinc, both the members undergo different amounts of thermal expansion because of the different coefficients of thermal expansion. As a result, both members curve at the engaging surface. Accordingly, the relative positions among the laser device 24, half mirror 25 and reflecting mirror 27 of the body 20 are changed, causing the optical axis of the laser beam to deflect from the designed optical axis.

Accordingly, the reliability of the pickup is deteriorated.

SUMMARY OF THE INVENTION

An object of the present invention is to provide an optical pickup which may prevent the deflection of the optical axis.

According to the present invention, an optical pickup comprises a pickup body having an optical system and a yoke base having an actuator, and the pickup body and the yoke base are made of the same magnetic materials.

The magnetic material is, for example, iron.

In order to prevent the optical axis of laser beam from deflecting from a designed axis, the pickup body and the yoke base are made of the same magnetic material. Therefore, even if the base and the body are expanded with ambient temperature, the engaging portions of the base and the body does not curve. Thus, the positions of the optical elements in the body do not change.

The other objects and features of this invention will become understood from the following description with reference to the accompanying drawings.

DETAILED DESCRIPTION OF THE PREFERRED EMBODIMENTS

Figure 7:
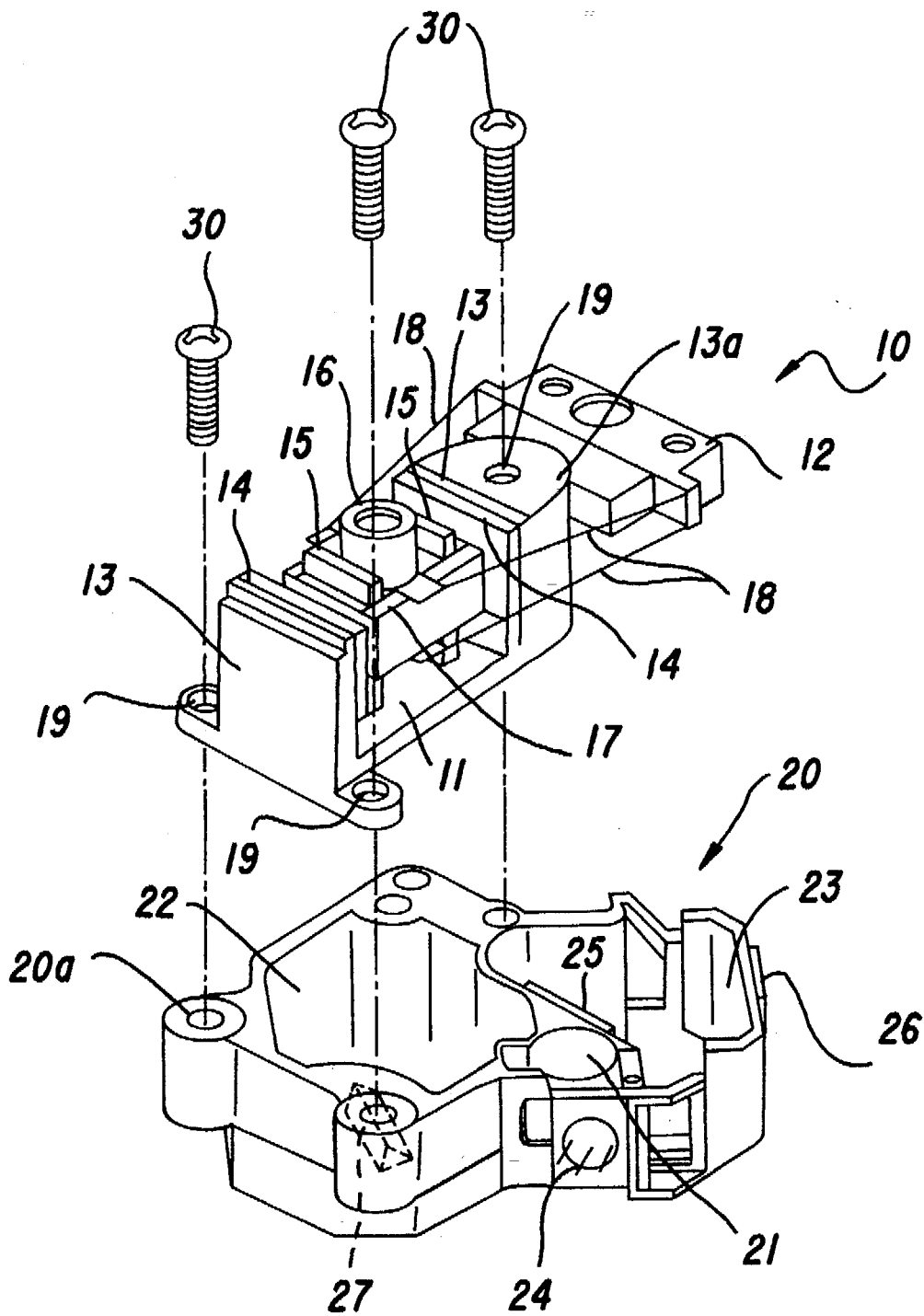
FIG. 7 is an exploded perspective view of a conventional optical pickup.

Referring to FIGS. 1 to 4 showing the optical pickup according to the present invention, the same parts as the conventional pickup are identified with the same reference numerals as FIG. 7. A pickup body 2 is provided for mounting the optical system and formed by bending a plate made of magnetic material such as iron. A yoke base 1 is provided for mounting the actuator and made of the same magnetic material as the pickup body 2.

The pickup body 2 has bent portions 28A and 28D. The laser device 24 is provided on the bent portion 28A, and the optical electronic integrated circuit (OEIC) 26 is provided on the bent portion 28D. The body 2 is further provided with a pair of projections 28B to which the half mirror 25 is secured, and a frame 28C to which the reflecting mirror 27 is secured. A frame 28E made of plastic is provided on the body 2 between the half mirror 25 and the frame 28C for mounting a collimator lens 29.

The yoke base 1 has a pair of yokes 5, each having a magnet 4. A suspension base 6 is secured to the yoke base 1 by a screw 19a. A holder 7 is suspended from the suspension base 6 by four conductive spring wires 18 in the same manner as the conventional one. The holder 7 is disposed between the magnets 4, so that the magnets 4 are positioned adjacent the coil substrates of the holder 7, respectively.

The yoke base 1 is secured to the pickup body 2 by screws 3.

Figure 1:
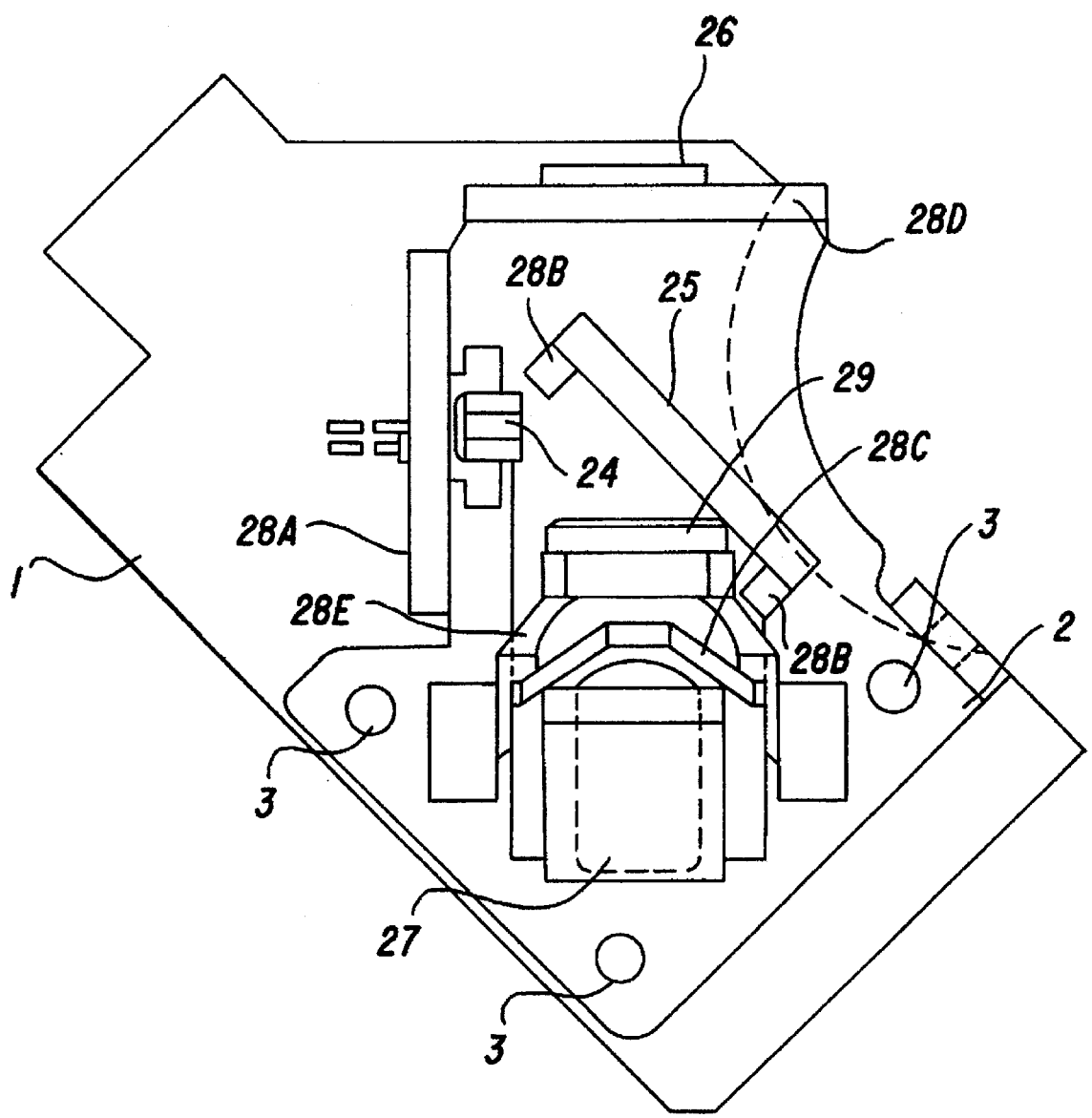
FIG. 1 is a plan view of an optical pickup according to the present invention.
Figure 2:
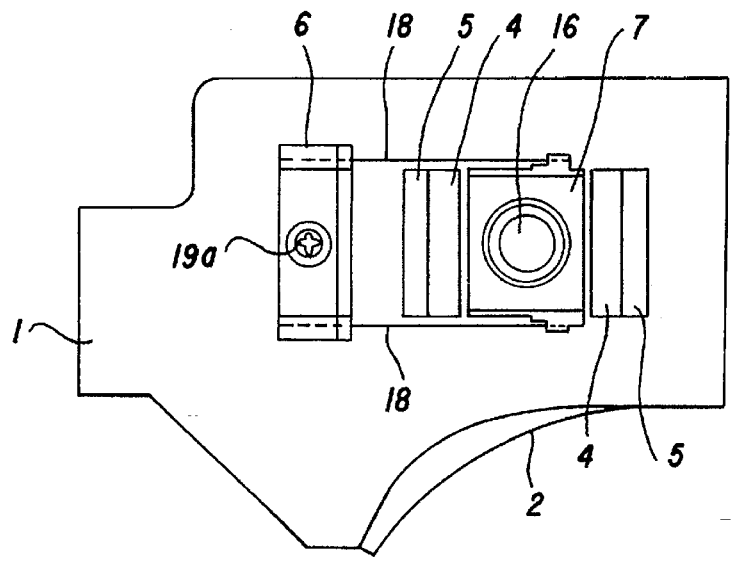
FIG. 2 is a plan view showing an actuator of the pickup.
Figure 3:
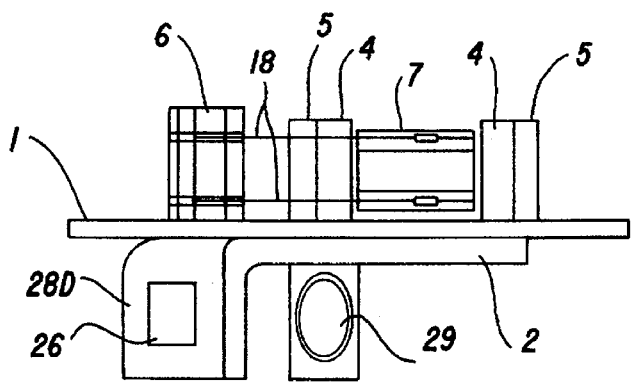
FIG. 3 is a side view partly showing the actuator of the pickup.
Figure 4:
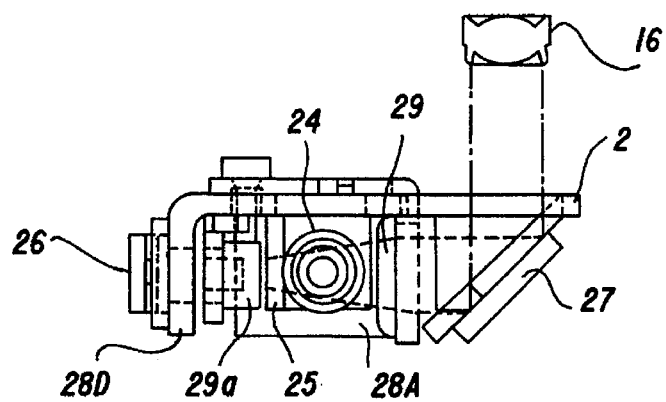
FIG. 4 is a side view partly showing the optical system of the pickup.
Figure 5:
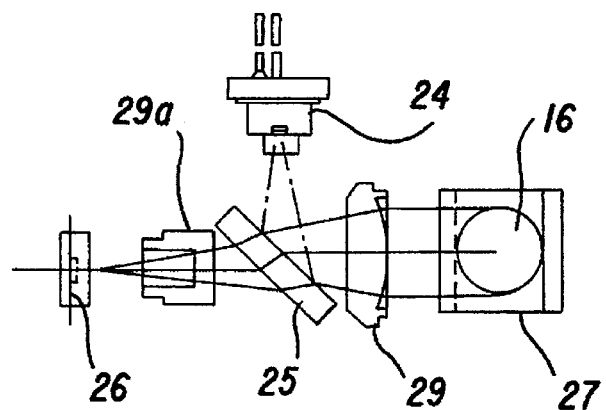
FIG. 5 is a plan view of the optical system.
Figure 6:
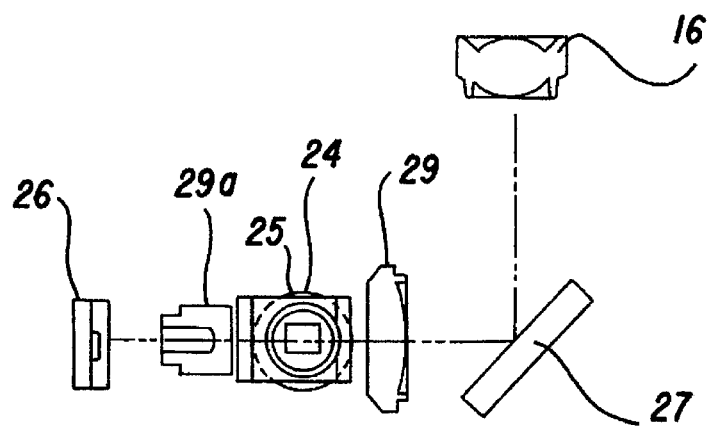
FIG. 6 is a side view of the optical system.

Referring to FIGS. 5 and 6, in operation, a laser beam emitted from the semiconductor laser device 24 is reflected on the half mirror 25 to the reflecting mirror 27 passing through the collimator lens 29 where the beam is shaped into a parallel beam. The beam is reflected on the reflecting mirror 27 to the objective 16 and focused on an optical disc (not shown) by the objective 16.

The reflected beam from the disc passes in reverse and is reflected on the half mirror 25 to the circuit 26 and focused thereon by a condenser lens 29a.

The pickup body 2 mounting the optical system and the yoke base 1 mounting the actuator are made of the same magnetic material and hence have the same thermal expansion. Therefore, if the yoke base and the pickup body are expanded or contracted with the ambient temperature, the relative portion of the yoke base to the pickup body does not change. Since the positions of the laser device 24 and mirrors 25 and 27 do not change, the optical axis of the laser beam does not deflect from the desired optical axis.

In the embodiment, the yoke base 1 is secured to the pickup body 2. Consequently, the pickup body 2 acts as a part of the magnetic circuit. Thus, if the yoke base 1 is reduced in thickness, a necessary amount of the magnetic flux between the magnets 4 and the coil substrates of the holder 7 is maintained. Consequently, a compact optical pickup having a thin thickness can be provided.

In the present invention, the yoke base 1 can be secured to the pickup body 2 by staking in place of screws. Since they are composed of the same material, plastic deformations of both members at staking are equal to each other. Thus, both members are assembled with accuracy.

Furthermore, the yoke and the body may be integrally formed by bending a single plate. In the case, assembling process is omitted and the reliability of the pickup is further improved.

In accordance with the present invention, the pickup body and the yoke base are made of the same magnetic material and hence both member are same in thermal expansion. Therefore, the pickup body and the yoke base do not curve when expanding and contracting with variation of ambient temperature. Thus the positions of the optical elements in the body do not change. Hence, the optical axis of the laser beam does not deflect from a desired axis, so that the reliability of the pickup is improved.

Since the yoke base is secured to the pickup body, the pickup body acts as a part of the magnetic circuit. Thus, if the yoke base is reduced in thickness, a necessary amount of the magnetic flux between the magnets and the coil substrates of the holder is maintained. Consequently, a compact optical pickup having a thin thickness can be provided.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An improved optical pickup for reproducing information on an optical disc comprising:

a pickup body mounting an optical system which outputs a laser beam, said optical system including a laser device and other optical devices, said pickup body is formed by bending a single plate made of magnetic material, said bent single plate has bent portions mounted with said laser device and said other optical devices; and a yoke base mounting an actuator, and an objective lens supported on the actuator and movable with respect to the yoke base, the objective lens being such that the laser beam from the optical system of the pickup body passes therethrough and is directed to the optical disc and focused on the optical disc, said actuator includes a pair of yokes which are made of a magnetic material and which are fixed on said yoke base, at least one of said pair of yokes is provided with a magnet, wherein a magnetic circuit is formed by said pair of yokes, said magnet and said yoke base, and wherein the pickup body and the yoke base being made of a same magnetic material to prevent an optical axis of the laser beam, from deflecting from a designed optical axis.

2. The optical pickup according to claim 1 wherein the magnetic material is iron.

3. The optical pickup according to claim 1 wherein the actuator further comprises a suspension base and secured to the yoke base, a holder suspended from the suspension base by conductive wires.

4. The optical system according to claim 1 wherein the yoke base is secured to the pickup body by means of one of screws, staking and integral formation by bending a single plate.

5. An improved optical pickup for reproducing information on an optical disc comprising:

a pickup body mounting an optical system which outputs a laser beam, said optical system including a laser device and other optical devices; and a yoke base mounting an actuator, and an objective lens supported on the actuator and movable with respect to the yoke base, the objective lens being such that the laser beam from the optical system of the pickup body passes therethrough and is directed to the optical disc and focused on the optical disc, said actuator includes a pair of yokes which are made of a magnetic material and which are fixed on said yoke base, at least one of said pair of yokes is provided with a magnet, wherein a magnetic circuit is formed by said pair of yokes, said magnet and said yoke base, wherein the yoke base is secured to the pickup body by means of integral formation by bending a single plate, said bent single plate having bent portions mounted with said laser device and said other optical devices and wherein the pickup body and the yoke base being made of a same magnetic material to prevent an optical axis of the laser beam from deflecting from a designed optical axis.

6. The optical pickup according to claim 5 wherein the magnetic material is iron.

7. The optical pickup according to claim 5 wherein the actuator further comprises a suspension base and secured to the yoke base, a holder suspended from the suspension base by conductive wires.

* * * * *